United States Patent Office 2,945,768
Patented July 19, 1960

2,945,768
VITREOUS REFRACTORY COMPOSITION AND METHOD FOR MAKING SAME

Ralph E. Grim, Urbana, Ill., assignor to Minerals & Chemicals Corporation of America, Menlo Park, N.J., a corporation of Maryland No Drawing. Filed Sept. 25, 1958, Ser. No. 763,173

8 Claims. (Cl. 106—52)

The instant invention relates to novel vitreous refractory compositions and to a method for making the same. More specifically, the invention relates to novel vitreous silica-phosphate compositions and to a method for making such compositions.

In recent years glass technology has advanced considerably with the result that many novel glass compositions and methods of fabrication have been introduced. This has resulted in the use of glass in many new fields and in novel forms, such as foams and filaments. One field in which glass is now employed is in refractory products, such products consisting essentially of silica and being essentially devoid of flux metals which would detract from the refractoriness and electrical properties of the silica. Vitreous silica, provided by the fusion of high purity quartz or glass sand, represents the optimum in refractoriness in addition to possessing other desirable properties, such as chemical inertness. Nevertheless, the high cost of preparing and processing vitreous silica, due to the high fusion temperature of the silica (in excess of 3000° F.) and the sharp melting point of the molten silica, precludes its use in many instances. So-called "96% silica glass" or Vycor glass is made by melting an alkali-borosilicate glass, and leaching the heat-treated product and firing the resultant porous glass. Such glass has high refractoriness (softening temperature about 2800° F.) although its cost is prohibitive for many applications. Pyrex, a borosilicate glass, is useful for high temperature service only up to about 1000° F. at which temperature softening takes place. However, of the relatively new types of glasses hereinabove described, only the borosilicate glasses can be melted and shaped by conventional mass production methods.

It is thus apparent that there exists a need for a glass having a degree of refractoriness which is improved substantially over that of Pyrex glass, which does not have a sharp melting point so that the glass may be fabricated in a variety of forms and which is free from deleterious flux metals.

Accordingly, it is a principal object of the subject invention to provide a vitreous composition of high silica content which is more readily prepared than high silica content glasses heretofore available.

It is another object of my invention to provide such a vitreous composition which is essentially free from metallic constituents.

It is another and important object of my invention to produce from a siliceous material ordinarily considered a waste product a valuable high silica content glass.

It is a further object of my invention to provide a vitreous refractory composition which is amenable to various forming methods and which may be formed by fusion at a temperature lower than that at which pure quartz is fusible.

Another object of my invention is the provision of a novel method for the preparation of a vitreous two-component refractory composition comprising silica and phosphoric acid.

These, and further objects and advantages, are realized, in accordance with my invention, by the provision of silica-phosphate vitreous compositions derived from certain forms of silica not heretofore employed in the preparation of glass.

Briefly, in accordance with my invention, highly refractory two-component vitreous compositions are prepared by fusing a mixture of a unique form of silica and a minor quantity of phosphoric acid, said silica being an artificial pseudomorphic form of silica, i.e., the silica skeleton of certain silicate minerals, and then cooling the fused mixture. Silica-phosphate glass thus prepared is useful in service at temperatures in excess of 1800° F., with the refractoriness of the formulation being related to the ratio of silica to $P_2O_5$ in the composition.

I am aware that silica bricks have been chemically bonded with phosphoric acid, such compositions being the subject of U.S. Patent No. 2,802,749 to West et al. Therein, crystalline forms of silica such as quartz, tridymite or cristobalite are mixed with small quantities of phosphoric acid to improve the green strength of the brick. In the case of the Rebuffat patent, U.S. No. 1,420,284, a small quantity of phosphoric acid is used to accelerate the conversion rate of quartz into the low density allotropic forms of silica.

The phase changes encountered in the preparation of compositions within the compass of my invention differ substantially from changes met in preparing phosphate bonded or treated silica bricks of the prior art. The pseudomorphic form of silica undergoes conversion to its high temperature forms (tridymite and cristobalite and polymorphic forms thereof) at temperatures considerably lower than does quartz. Presumably because of the high reactivity of the artificial pseudomorphic form of silica, the reaction between said silica and the phosphoric acid differs from the reaction between other crystalline silicas and the acid, whereby the phases present at various firing levels differ substantially when an artificial pseudomorphic form of silica is used in lieu of quartz, tridymite or cristobalite.

More specifically, my invention is carried out by admixing the silica skeleton of certain silicate minerals, hereinafter to be described, with phosphoric acid in amount such that the $P_2O_5$ content of the mix is ordinarily within the range of about 0.25 to 15%, and preferably less than about 8%, based on the V.F. weight of the mix. Although glasses are formed with higher $P_2O_5$ contents, nevertheless, the degree of refractoriness of glasses thus formulated is not as satisfactory as when the $P_2O_5$ content is more restricted. The term "V.F." refers to volatile free weight which is the weight of the mix after heating to essentially constant weight at about 220° F. Mixing is preferably carried out in the presence of water whereby the silica, being highly sorptive, sorbs the phosphoric acid and reaction therebetween is facilitated. The mix is fired to a temperature in excess of about 1850° F., and usually in excess of 2372° F., and sufficient to fuse the mixture; the fused mixture after cooling provides a vitreous mass consisting essentially of silica in combination with a minor amount of an oxide of phosphorous. The amount of phosphoric acid that is used is not in excess of that which will lower the melting point of the mix below about 1850° F., and is preferably such that the melting point of the mix is in excess of about 2372° F.

The form of silica which I employ in accordance with my invention is a silica residue produced by removal of cations other than silica from a mineral structure of a sort in which there is a continuous silica skeleton, e.g., kaolinite, attapulgite, vermiculite, sepiolite and some zeolites and micas. Naturally occurring forms of silica, such as quartz or its polymorphs are not suitable because of their lower reactivity towards the phosphoric acid. Furthermore, the high degree of sorptivity possessed by the form of silica I employ is not possessed by other crystalline forms of silica.

These siliceous residues which I employ consist essentially of silica, the morphology of which is substantially that of silica in the silicate precursor. Trace amounts of basic oxides, such as oxides of calcium, magnesium, iron and/or titanium may be present, depending on the source and the processing employed, although preferably flux metals are absent. Optimum refractoriness of the ultimate vitreous product is realized when the metallic oxide content is substantially immeasurable. When the artificial pseudomorph is obtained by sulfuric acid extraction of a silicate the pseudomorph may include sulfur, a substantial portion of which, in some cases, is not in a form extractable from the silica, thus indicating entry of sulfur in the silica lattice. Such sulfur is not deleterious and very satisfactory glasses are prepared from artificial pseudomorphs of silica having sulfur impurities. For a description of methods for obtaining artificial pseudomorphs of silica from clays by acid extraction and electrodialysis, reference is made to R. E. Grim, Clay Mineralogy, pages 295–300 (1953). Patents concerning the extraction of basic oxides from the silica of clays include: U.S. Patent No. 2,476,979 to Hoeman; 2,381,477 to Walthall, and 2,551,944 to Haff. Such silica residues are characterized by fine particle size and low bulk density and are ordinarily considered waste products provided by the acid leaching of clays to extract aluminum values therefrom.

The silica residue, particularly such a residue of which kaolinite is the precursor, is essentially amorphous to X-ray. Electron diffraction studies have, however, indicated a higher degree of order than exhibited by truly amorphous material. Electron microscope studies showed that the crystalline morphology of kaolinite persisted even following removal of essentially all aluminum from the kaolinite lattice.

The phosphoric acid I employ may be orthophosphoric acid or its dehydration products which include pyrophosphoric acid, metaphosphoric acid and $P_2O_5$. However, since I preferably employ water to facilitate admixture of the highly sorptive silica and phosphoric acid and to promote reaction therebetween, the most economical source of $P_2O_5$ is orthophosphoric acid. The amount of water I thus employ may be substantial.

The acid and silica may be admixed at room temperature or, if so desired, admixing may be initiated at an elevated temperature at which the fluidity of the phosphoric acid is greater, and sorption of the phosphoric acid by the silica is promoted.

The molten silica-phosphate composition may be fabricated by casting, by formation of foams or by drawing into filaments, such fabricating processes being well-known to those skilled in the art. Foams and filaments prepared from the melt are useful particularly for high temperature insulating service, such as service for which diatomaceous earth is now used. Cast glass may be used in brick form for lining refractories. Vitreous silica-phosphate bodies may be formed in situ by fusing a suitable silica-phosphoric acid mixture in a suitable mold; if so desired, such bodies may be made pumiceous by gas inclusion during solidification and will, accordingly, be useful as refractory insulating bodies.

The following example is given only for the sake of illustrating an embodiment of my invention and is not intended to limit the invention to the specific materials disclosed.

In this example, an artificial pseudomorphic form of silica in finely divided form was used, the product being obtained by sulfuric acid leaching of kaolin clay.

In the example the silica residue from kaolin had the following analysis:

| | Weight percent |
|---|---|
| Loss on ignition @ 1800° F. | 8.51 |
| $Al_2O_3$ | 0.41 |
| $Fe_2O_3$ | 0.003 |
| $TiO_2$ | 0.097 |
| $SiO_2$ | 86.23 |
| $SO_3$ | 4.75 |
| | 100.000 |

Various mixes of the artificial pseudomorph of silica from kaolin clay and orthophosphoric acid in amounts equivalent to about 4 to 63% $P_2O_5$ were prepared and pressed into test specimens which were fired at three different temperature levels, i.e., 1112° F., 1850° F. and 2372° F. Crystalline phases present in test samples after firing at these temperature levels were identified by X-ray diffraction procedures and visual observation of the fired test samples were also recorded.

In the preparation of the various mixes used in making test specimens, 85% orthophosphoric acid was added in various amounts to 30 grams of the finely divided silica residue and admixed therewith for several minutes; the $H_2O$ was added and mixing continued for several minutes more. Each mixture was then disaggregated in a laboratory hammermill. The proportions of silica residue, bonding agent and water used in each mixture is indicated in Tables I and II. Also given in the tables is the amount of $P_2O_5$ present, calculated on a volatile free (V.F.) basis from analysis of supplier (no account could be made for losses during mixing).

Each sample was then placed in a 2¼" test cylinder in a Carver laboratory press and compressed under 2500 p.s.i. Test pieces were 2¼" in diameter and approximately ⅜" thick.

Test pieces were air-dried overnight and then oven dried at 225° F. for 15 hours.

Each test piece was then fired to 1112° F. in a laboratory muffle furnace for 24 hours. All test pieces were then refired to 1850° F. in a kiln and subsequently fired to 2372° F. in a gas-fired kiln for 24 hours.

Samples of test specimens were taken following firing to 1112° F., 1850° F. and 2372° F. Crystalline phases present were identified by X-ray diffraction procedure. Samples of specimens were also X-rayed following oven drying at (225° F.) to ascertain presence of silicon phosphates; none was present at this temperature.

For identification of cristobalite and tridymite, A.S.T.M. cards 40379 and 3–0227, respectively, were used. Samples of various silicon phosphates from Monsanto Chemical Company supplied diffraction data for these compounds.

TABLE I

*Silica-phosphate compositions*

| Sample Identification | Grams Kaosil | Grs./Ml. of 85% Orthophosphoric Acid | Ml. $H_2O$ | Percent $P_2O_5$ in V.F. Mix |
|---|---|---|---|---|
| 3.96% $P_2O_5$ | 30.0 | 1.25 | 18.75 | 3.96 |
| 7.92% $P_2O_5$ | 30.0 | 2.50 | 17.5 | 7.92 |
| 15.85% $P_2O_5$ | 30.0 | 5.0 | 15.0 | 15.85 |
| 31.70% $P_2O_5$ | 30.0 | 10.0 | 10.0 | 31.70 |
| 47.50% $P_2O_5$ | 30.0 | 15.0 | 10.0 | 47.50 |
| 63.4% $P_2O_5$ | 30.0 | 20.0 | 5.0 | 63.40 |

TABLE II

*Visual appearance of fired silica-phosphate bodies*

| Sample | 1,112° F. | 1,850° F. | 2,372° F. |
|---|---|---|---|
| 3.96% $P_2O_5$ | Non-vitreous | Non-vitreous | Non-vitreous. |
| 7.92% $P_2O_5$ | do | do | Part. Fused. |
| 15.85% $P_2O_5$ | do | Porcelaneous | Pumiceous. |
| 31.70% $P_2O_5$ | do | do | Melt. |
| 47.50% $P_2O_5$ | do | Pumiceous | Do. |
| 63.40% $P_2O_5$ | do | Porcelaneous | Do. |

Crystalline phases identified are indicated in Table III. Relative intensities of diagnostic diffraction maxima are given, indicating relative amounts of each phase present.

The pumiceous body prepared by firing a silica-phosphate mix containing 15.85% $P_2O_5$ to 2372° F., as hereinabove described, is useful as an insulating refractory material.

Each test specimen was very strong at temperatures up to 1112° F., indicating the presence of a silicon phosphate phase. At 1112° F. the phosphate phase proved to be, by X-ray examination, $Si_3(PO_4)_4$ rather than $SiP_2O_7$. Presumably, under the test conditions employed, silicon orthophosphate formed before the acid could dehydrate to its pyro form.

At 1850° F. all specimens showed evidence of fusing to various degrees, taking on porcelaneous or pumiceous structures.

At 2372° F. all samples containing more than about 8% $P_2O_5$ had melted completely. Samples containing less than about 8% $P_2O_5$ are extremely valuable refractory materials since they melt over a temperature range in excess of 2372° F. to form glasses.

firing said mixture at a temperature sufficient to melt said mixture and cooling the molten mixture.

4. The method of making a vitreous refractory composition which comprises mixing the silica residue produced by removal of cations other than silica from mineral structures in which there is a continuous silica skeleton, orthophosphoric acid in an amount such that the $P_2O_5$ content of the mixture, on a volatile-free basis, is within the range of about 0.25% to about 15%, and, without addition of other flux material, firing said mixture at a temperature sufficient to melt said mixture and cooling the molten mixture.

5. The method of making a vitreous refractory composition which comprises forming a mixture of the silica residue produced by removal of cations other than silica from mineral structures in which there is a continuous silica skeleton with phosphoric acid in the presence of water and in the substantial absence of added flux material, the quantity of phosphoric acid being such that the $P_2O_5$ content of the mixture, on a volatile-free basis, is within the range of about 0.25% to about 15%, firing said mixture to a temperature at least sufficient to melt said mixture, and cooling the molten mixture.

TABLE III

*High temperature crystalline phases identified by X-ray diffraction*

RELATIVE INTENSITY OF DIAGNOSTIC DIFFRACTION MAXIMA

|  | 1,112° F. | 1,850° F. | | | 2,372° F. | | |
|---|---|---|---|---|---|---|---|
|  |  | Cristobalite | Tridymite | Others | Cristobalite | Tridymite | Others |
| 3.96% $P_2O_5$ |  | V.S. | W. |  | V.S. | M. |  |
| 7.92% $P_2O_5$ | $Si_3(PO_4)_4$ (W.) | M.S. | W. |  | S. | M. |  |
| 15.85% $P_2O_5$ | $Si_3(PO_4)_4$ (M.) | M. | W. | Mostly Glass | V.W. |  | Mostly Glass. |
| 31.70% $P_2O_5$ | $Si_3(PO_4)_4$ (S.) |  |  | Glass |  |  | Glass. |
| 47.50% $P_2O_5$ | $Si_3(PO_4)_4$ (S.) |  |  | Glass; $Si_3(PO_4)_4$ (W.) |  |  | Do. |
| 63.40% $P_2O_5$ | $Si_3(PO_4)_4$ (S.) |  |  | Glass; $Si_3(PO_4)_4$ (M.) |  |  | Do. |

V.S.—very strong; S.—strong; M.—moderate; M.W.—moderately weak; W.—weak; V.W.—very weak.

I claim:

1. The method of making a vitreous refractory composition which comprises mixing the silica residue produced by removal of cations other than silica from a mineral structure in which there is a continuous silica skeleton, phosphoric acid in an amount such that the $P_2O_5$ content of the mixture, on a volatile-free basis, is within the range of about 0.25% to about 15%, and firing said mixture at a temperature sufficient to melt said mixture and cooling the molten mixture.

2. The method of making a vitreous refractory composition which comprises mixing the silica residue produced by removal of cations other than silica from a mineral structure in which there is a continuous silica skeleton, phosphoric acid in an amount such that the $P_2O_5$ content of the mixture, on a volatile-free basis, is within the range of about 0.25% to about 15%, and, without addition of other flux material, firing said mixture at a temperature sufficient to melt said mixture and cooling the molten mixture.

3. The method of making a vitreous refractory composition which comprises mixing the silica residue produced by removal of cations other than silica from a mineral structure in which there is a continuous silica skeleton, orthophosphoric acid in an amount such that the $P_2O_5$ content of the mixture, on a volatile-free basis, is within the range of about 0.25% to about 15%, and 6. The method of making a vitreous refractory material which comprises forming a mixture of the acid-leached silica residue of kaolin clay with orthophosphoric acid in the presence of water, the quantity of orthophosphoric acid being such that the $P_2O_5$ content of the mixture, on a volatile-free basis, is within the range of about 0.25% to about 15%, firing said mixture at a temperature in excess of about 1850° F. and sufficient to melt said mixture and cooling the molten mixture.

7. A two-component vitreous refractory composition consisting of $SiO_2$ and $P_2O_5$, the $P_2O_5$ content of the vitreous composition being within the range of from about 0.25% to about 15% by weight.

8. A two-component vitreous refractory composition having the characteristic of melting at a temperature in excess of 1850° F., said composition consisting solely of $SiO_2$ and $P_2O_5$, the $P_2O_5$ content being within the range of from about 0.25% to about 8%.

References Cited in the file of this patent

UNITED STATES PATENTS 2,802,749    West et al.    Aug. 13, 1957

FOREIGN PATENTS 674,247    Great Britain    June 18, 1952